United States Patent
Zuo et al.

(10) Patent No.: US 9,554,074 B2
(45) Date of Patent: Jan. 24, 2017

(54) RAMP GENERATOR FOR LOW NOISE IMAGE SENSOR

(71) Applicant: OMNIVISION TECHNOLOGIES, INC., Santa Clara, CA (US)

(72) Inventors: Liang Zuo, San Jose, CA (US); Zhiqiang Song, San Jose, CA (US); Liping Deng, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 95 days.

(21) Appl. No.: 14/688,260

(22) Filed: Apr. 16, 2015

(65) Prior Publication Data

US 2016/0309106 A1    Oct. 20, 2016

(51) Int. Cl.
*H04N 5/378* (2011.01)
*H04N 5/357* (2011.01)

(52) U.S. Cl.
CPC .............. *H04N 5/378* (2013.01); *H04N 5/357* (2013.01)

(58) Field of Classification Search
CPC ......... H04N 5/357; H04N 5/374; H04N 5/378
USPC .......... 250/208.1, 214 R; 341/156, 161, 169; 348/241, 322, 323
See application file for complete search history.

(56) References Cited

U.S. PATENT DOCUMENTS

| 9,380,208 B1* | 6/2016 | Yuan | H04N 5/23241 |
| 2012/0256648 A1* | 10/2012 | Krasowski | H02S 50/10 324/750.01 |

| 2013/0242125 A1 | 9/2013 | Yang et al. |
| 2014/0008515 A1* | 1/2014 | Wang | H03M 1/145 250/208.1 |
| 2014/0048685 A1 | 2/2014 | Zhang et al. |

FOREIGN PATENT DOCUMENTS

| TW | 201345251 A | 11/2013 |
| TW | 201412111 A | 3/2014 |

OTHER PUBLICATIONS

TW Patent Application No. 105107373—Taiwanese Office Action and Search Report, with English Translation, issued Nov. 7, 2016 (7 pages).

* cited by examiner

Primary Examiner — Kevin Pyo
(74) *Attorney, Agent, or Firm* — Blakely Sokoloff Taylor & Zafman LLP

(57) ABSTRACT

A readout circuit for use in an image sensor includes a sense amplifier circuit coupled to a bitline to sense analog image data from a pixel cell of the image sensor. An analog to digital converter is coupled to the sense amplifier circuit to convert the analog image data to digital image data. A ramp generator circuit is coupled to generate a first ramp signal. The analog to digital converter is coupled to generate the digital image data in response to the analog image data and the first ramp signal. A first capacitive voltage divider is coupled to the ramp generator. The first capacitive voltage divider is coupled to reduce an output voltage swing of the first ramp signal coupled to be received by the analog to digital converter to reduce noise in the first ramp signal.

19 Claims, 5 Drawing Sheets

RAMP GENERATOR FOR LOW NOISE IMAGE SENSOR

BACKGROUND INFORMATION

Field of the Disclosure

The present invention relates generally to image sensors. More specifically, examples of the present invention are related to circuits that read out image data from image sensor pixel cells.

Background

Image sensors have become ubiquitous. They are widely used in digital cameras, cellular phones, security cameras, as well as, medical, automobile, and other applications. The technology used to manufacture image sensors, and in particular, complementary metal-oxide-semiconductor (CMOS) image sensors, has continued to advance at a great pace. For example, the demands for higher resolution and lower power consumption have encouraged the further miniaturization and integration of CMOS image sensors.

In CMOS image sensors, performance factors such as horizontal noise (h-noise), circuit power supply rejection ratio (PSRR), power consumption, etc., have been key parameters in which efforts have been made for improvement in recent years. Since human vision is especially sensitive to horizontal banding/noise in images, enormous efforts have been made to reduce this type of noise. Specifically, with regard to the most popular image sensor readout structures, column-wise analog to digital converters tend to generate large amounts of horizontal noise because the ramp generators are row-wise signals. Consequently, any noise in the ramp generator ramp outputs lead to different row-by-row readout performance. Similarly, due to the nature of single-ended ramp generators, power supply rejection ratio is also an important factor to be considered. An insufficient power supply rejection ratio will cause image horizontal banding due to ripple in the analog power supply.

Another concern with image sensor chips is the analog power consumption. A typical analog power supply for a state-of-the-art image sensor is around 2.8 V. This high analog VDD voltage is necessary in order for pixels to output full well signals. However, with image pixels being developed in a more aggressive fashion, smaller size pixels also have a lower full well requirement. As a result, compared to previous image pixels, a ~1 V, ~500 mV, or an even lower pixel output range is sufficient. Under these circumstances with lower pixel output ranges, a lower analog VDD supply voltage is a trend in future image sensor designs where power consumption is greatly reduced. Accordingly, readout circuitries also need to accommodate this lower analog VDD supply voltage trend, while still maintaining the same low noise performance.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
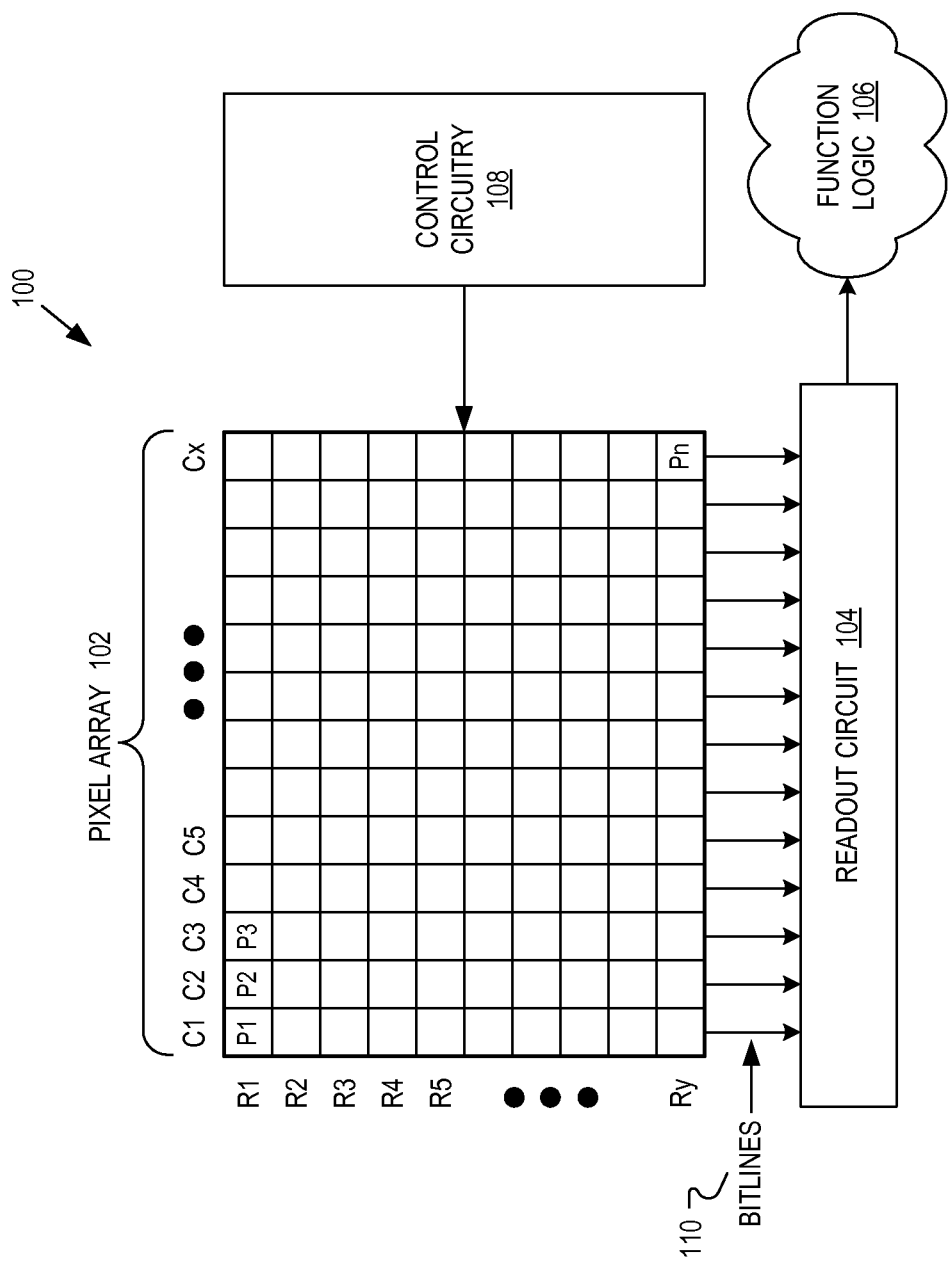
FIG. 1 is a is a block diagram illustrating an example imaging system including a pixel array having pixel cells and a readout circuit with a ramp generator for low noise in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example" means that a particular feature, structure or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures, or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Examples in accordance with the teaching of the present invention describe a ramp generator coupled to provide a ramp signal for an analog to digital converter. In one example, the ramp generator has a relatively large output voltage swing on the output ramp signal that is received with a capacitive voltage divider to reduce noise. The output voltage swing of the ramp signal is reduced by the capacitive voltage divider. In one example, the ramp generator provides a differential ramp output having two output ramp signals. In the example, the two output ramp signals are complementary signals that have relatively large output voltage swings. In the example, there is a capacitive voltage divider coupled to each differential ramp output of the ramp generator to reduce noise. The output voltage swing of each ramp signal is reduced by the respective capacitive voltage divider to reduce the output voltage swing.

To illustrate, FIG. 1 is a block diagram illustrating an example imaging system including a pixel array having pixel cells and a readout circuit to improve the power supply rejection ratio in bitlines in accordance with the teachings of the present invention. In particular, FIG. 1 depicts one example of an image sensing system 100 that includes a readout circuit 104 with a ramp generator with low noise in accordance with the teachings of the present invention. As shown in the depicted example, imaging system 100 includes pixel array 102 coupled to control circuitry 108, and a readout circuit 104, which is coupled to function logic 106.

In one example, pixel array 102 is a two-dimensional (2D) array of imaging sensors or pixel cells (e.g., pixel cells P1, P2, P3, . . . , Pn). In one example, each pixel cell is a CMOS imaging pixel. As illustrated, each pixel cell is arranged into a row (e.g., rows R1 to Ry) and a column (e.g., column C1 to Cx) to acquire image data of a person, place, object, etc., which can then be used to render a 2D image of the person, place, object, etc.

In one example, after each pixel cell has accumulated its image data or image charge, the image data is read out by readout circuit 104 through column bitlines 110 and then transferred to function logic 106. As will be shown, in various examples, readout circuit 104 may also include amplification circuitry, sampling circuitry, analog to digital converter circuitry, ramp generator circuitry, or otherwise. Function logic 106 may simply store the image data or even manipulate the image data by applying post processing image effects (e.g., crop, rotate, remove red eye, adjust brightness, adjust contrast, or otherwise). In one example, readout circuit 104 may readout a row of image data at a time along readout column bitlines 110 (illustrated), or may read out the image data using a variety of other techniques (not illustrated), such as a serial readout or a full parallel readout of all pixels simultaneously.

In one example, control circuitry 108 is coupled to pixel array 102 to control operational characteristics of pixel array 102. For example, control circuitry 108 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows.

Figure 2:
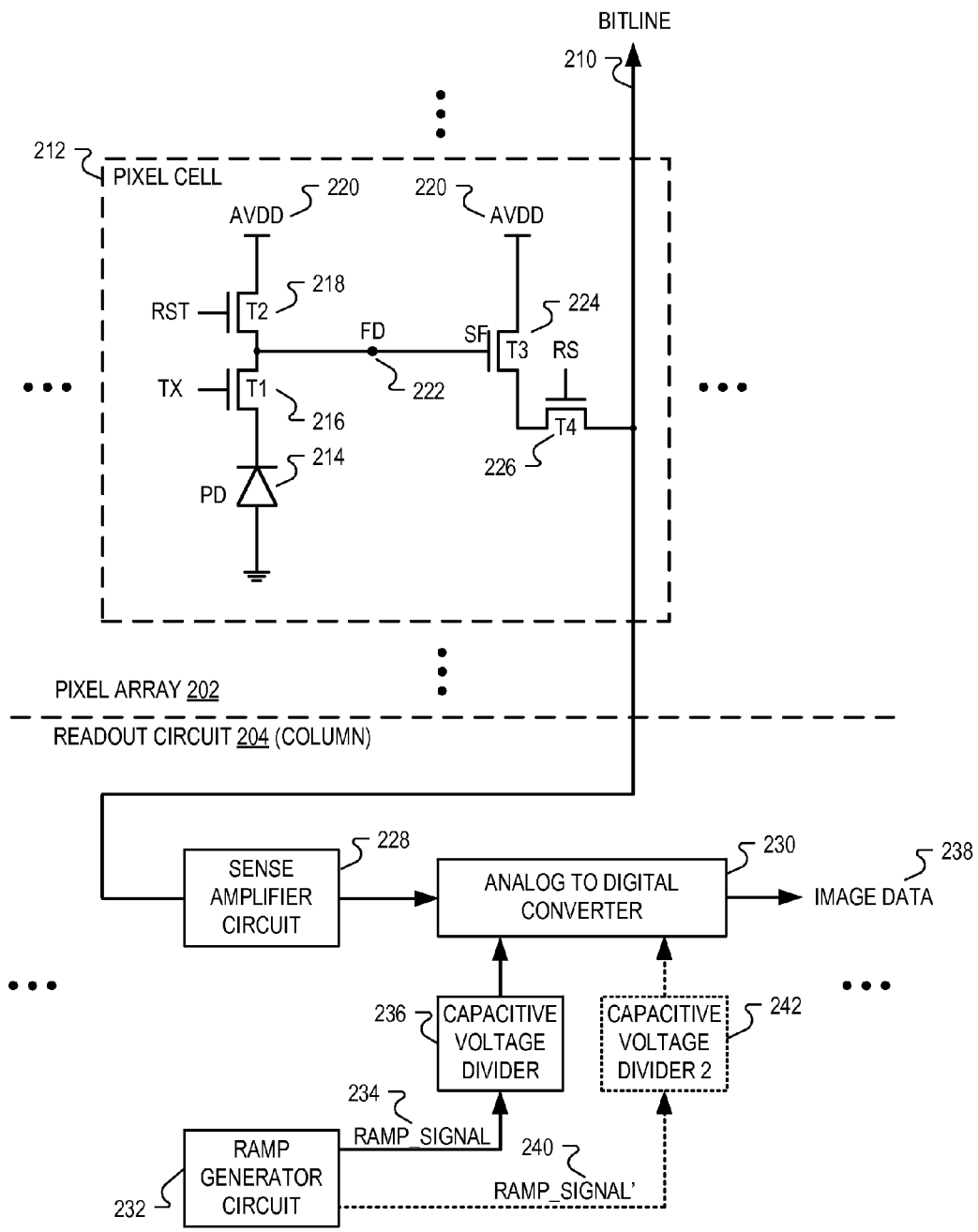
FIG. 2 is a schematic illustrating one example of a pixel cell coupled to a readout circuit including a ramp generator for low noise in accordance with the teachings of the present invention.

FIG. 2 is a schematic illustrating one example of a pixel cell coupled to readout circuitry including a ramp generator coupled to an analog to digital converter with low noise in accordance with the teachings of the present invention. In particular, FIG. 2 shows a schematic of one example of a pixel cell 212 a pixel array 202 coupled to a column of readout circuitry 204 having a readout architecture with low noise in accordance with the teachings of the present invention. It is noted that the pixel cell 212, pixel array 202, and readout circuit 204 of FIG. 2 may be examples pixel cells P1, P2, . . . Pn, pixel array 102, and readout circuit 104 of FIG. 1, and that similarly named and numbered elements referenced below are therefore coupled and function similar to as described above.

In the example depicted in FIG. 2, a pixel cell 212 is illustrated as being a four-transistor (4T) pixel cell. It is appreciated that pixel cell 212 is one possible example of pixel circuitry architecture for implementing each pixel cell within pixel array 202. However, it should be appreciated that other examples in accordance with the teachings of the present invention are not necessarily limited to 4T pixel architectures. One having ordinary skill in the art having the benefit of the present disclosure will understand that the present teachings are also applicable to 3T designs, 5T designs, and various other pixel cell architectures in accordance with the teachings of the present invention.

In the example depicted in FIG. 2, pixel cell 212 includes a photosensitive element, which may also be referred to as a photodiode (PD) 214 to accumulate image charge, a transfer transistor T1 216, a reset transistor T2 218, a floating diffusion (FD) node 222, an amplifier transistor, which is illustrated as a source-follower (SF) transistor T3 224, and a row select transistor T4 226. During operation, transfer transistor T1 216 receives a transfer signal TX, which selectively transfers the image charge accumulated in photosensitive element PD 214 to floating diffusion FD node 222.

As shown in the illustrated example, reset transistor T2 218 is coupled between a supply voltage AVDD 220 and the floating diffusion node FD 222 to reset levels in the pixel cell 212 (e.g., discharge or charge the floating diffusion node FD 222 and the photosensitive element PD 214 to a preset voltage) in response to a reset signal RST. The floating diffusion node FD 222 is coupled to control the gate of amplifier transistor SF T3 224. Amplifier transistor SF T3 224 is coupled between the supply voltage AVDD 220 and row select transistor RS T4 226. Amplifier transistor SF T3 224 operates as a source-follower amplifier providing a high impedance connection to the floating diffusion node FD 222. Row select transistor RS T4 226 selectively couples the image data output of pixel cell 212 to the readout column bitline 210 in response to a row select signal RS. In the illustrated example, bitline 210 is coupled to selectively readout image data from a column of the pixel array 202. Pixel cells arranged in the same column may share the same bit line.

The example depicted in FIG. 2 also illustrates a column of readout circuit 204, which includes a sense amplifier circuit 228 that is coupled to bitline 210 to read out image data from pixel cell 212 of pixel array 202. In one example, the image data that is sensed with sense amplifier circuit 228 may be sampled, and then output to an analog to digital converter 230, which converts the sensed analog image data received from sense amplifier circuit 228 to digital image data 238.

In one example, the analog to digital converter 230 is also coupled to receive a RAMP_SIGNAL 234 from a ramp generator circuit 232 through a capacitive voltage divider 236 in accordance with the teachings of the present invention. In one example, the output voltage swing of the RAMP_SIGNAL 234 is relatively large and therefore has low noise. In one example, a capacitive voltage divider 236 is coupled to the ramp generator circuit 232 to reduce the voltage swing of RAMP_SIGNAL 234 and further reduces noise in accordance with the teachings of the present invention. The analog to digital converter 230 outputs the digital image data 238 signal after the conversion process is complete in response to the RAMP_SIGNAL 234 signal and the analog image data signal received from sense amplifier circuit 228. In one example, the digital image data 238 may then be received by function logic 106, as shown in FIG. 1.

In another example, ramp generator circuit 232 has another ramp output, and therefore has two ramp outputs, including first RAMP_SIGNAL 234 and an optional second RAMP_SIGNAL' 240. In the example, first RAMP_SIGNAL 234 and second RAMP_SIGNAL' 240 are complementary signals that provide a differential output having relatively large output voltage swings with low noise. In the example with the optional second RAMP_SIGNAL' 240, a corresponding optional second capacitive voltage divider 242 is coupled to ramp generator circuit 232 to reduce the voltage swing of second RAMP_SIGNAL' 240 and further reduce noise in accordance with the teachings of the present invention. As shown in FIG. 2, the optional second RAMP_SIGNAL' 240 and second capacitive voltage divider 242 are illustrated with a dashed lines. As such, the analog to digital converter 230 outputs the digital image data 238 signal after the conversion process is complete in response to the first RAMP_SIGNAL 234 signal, the second RAMP_SIGNAL' 240, and the analog image data signal received from sense amplifier circuit 228. In one example, the digital image data 238 may then be received by function logic 106, as shown in FIG. 1.

Figure 3:
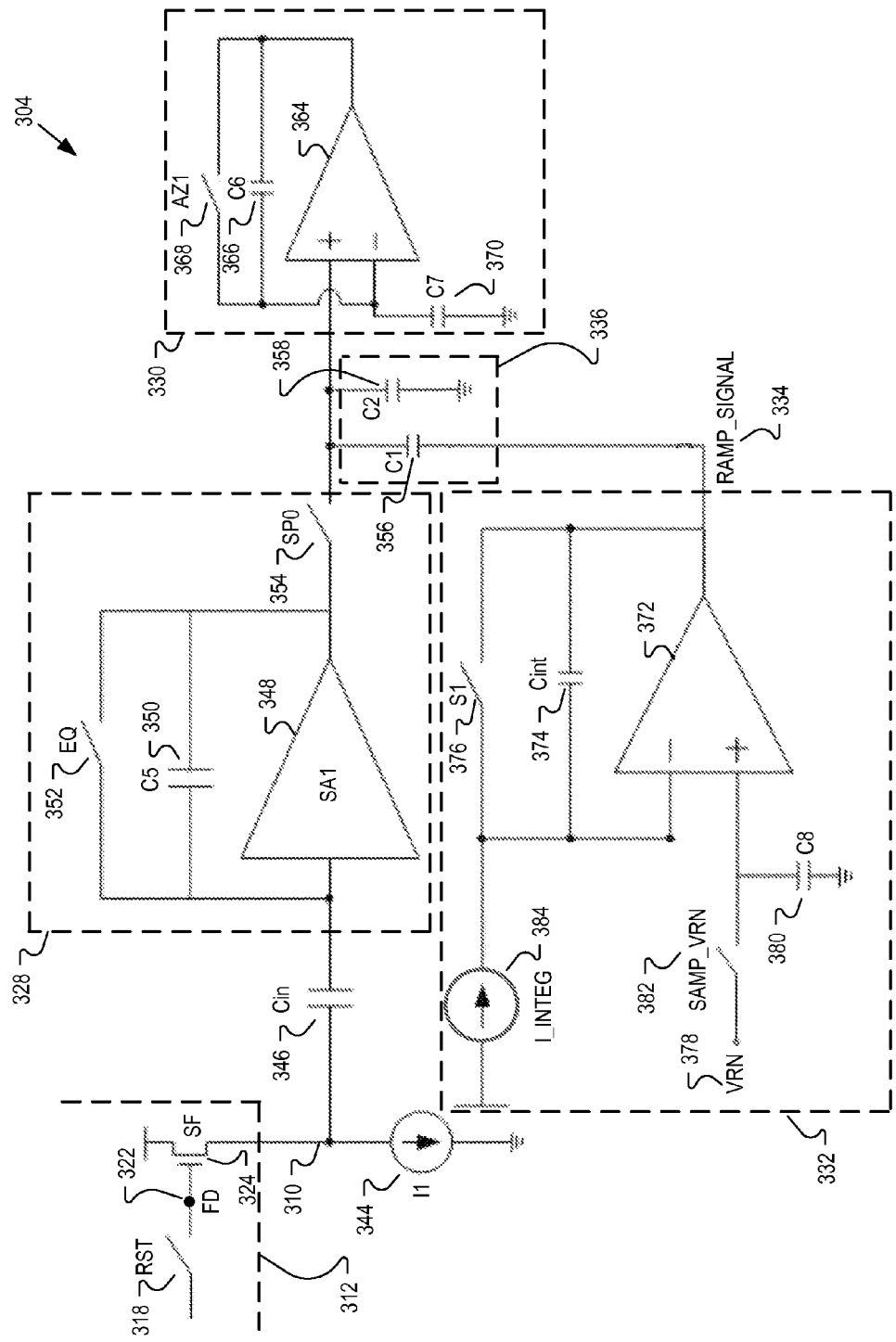
FIG. 3 is a schematic illustrating greater detail of one example of a ramp generator included in a readout circuit with low noise in accordance with the teachings of the present invention.

FIG. 3 is a schematic illustrating greater detail of one example of a ramp generator circuit 332 included in a readout circuit 304 with low noise in accordance with the teachings of the present invention. It is noted that the ramp generator circuit 332 of FIG. 3 and the elements included in readout circuit 304 may be an examples of ramp generator circuit 232 and readout circuit 204 of FIG. 2, and that similarly named and numbered elements referenced below are therefore coupled and function similar to elements as described above.

As shown in the depicted example, readout circuit 304 includes a sense amplifier circuit 328 coupled to a bitline 310 to sense analog image data from a pixel cell 312 of the image sensor. In one example, sense amplifier circuit 328 is coupled to sense the image data from a pixel cell 312 through an input coupling capacitor Cin 346 as shown. The example depicted in FIG. 3 illustrates that a current source 344 is coupled to sink a current I1 from bitline 310. Amplifier transistor SF 324 of pixel cell 312 is coupled to amplify the image data on floating diffusion FD node 322 to generate the analog image data on bitline 310 that is sensed by sense amplifier circuit 328. A reset switch 318 in pixel cell 312 is coupled to reset the image charge on floating diffusion node FD 322 in response to a reset RST signal.

In the depicted example, sense amplifier circuit 328 includes is a single input/single output amplifier SA1 348. In the example, the single input terminal is capacitively coupled to the output terminal of amplifier SA1 348 through a capacitor C5 350. In addition, the single input terminal is further coupled to output terminal of amplifier SA1 348 through an equalizing switch EQ 352. In the example, the output of the sense amplifier is switched through a switch SP0 354.

As shown in the illustrated example, an analog to digital converter 330 is coupled to sense amplifier circuit 328 to convert analog image data received from sense amplifier circuit 328 to digital image data. In the example, the analog to digital converter 330 includes a first operational amplifier 364 having a non-inverting input terminal coupled to first and second capacitors C1 356 and C2 358 of a first capacitive voltage divider 336, which will be described in further detail below. In the example, the first operational amplifier 364 further includes an inverting input terminal that is capacitively coupled to an output terminal of the first operational amplifier 364 through a capacitor C6 366. In addition, the inverting input terminal of the first operational amplifier 364 is further coupled to the output terminal of the first operational amplifier 364 through an analog to digital converter equalizing switch AZ1 368 as shown. In the example, the inverting input terminal of the first operational amplifier 364 is also capacitively coupled to a first reference voltage, (e.g., ground) through a capacitor C7 370.

The example depicted in FIG. 3 also illustrates ramp generator circuit 332 coupled to generate a first RAMP_SIGNAL 334 that is coupled to be received by the analog to digital converter 330 through the first capacitive voltage divider 336. In the example, first capacitive voltage divider 336 includes first capacitor C1 356 coupled to second capacitor C2 358. In the example, the first capacitor C1 356 is coupled between ramp generator circuit 332 and the non-inverting input terminal of the first operational amplifier 364 of the analog to digital converter 330. The second capacitor C2 358 is coupled between the non-inverting input terminal of first operational amplifier 364 and a first reference voltage terminal (e.g., ground). As such, the analog to digital converter 330 is coupled to generate the digital image data in response to the analog image data from sense amplifier circuit 328 and the first RAMP_SIGNAL 334 from ramp generator circuit 332 received through first capacitive voltage divider 336.

In the example depicted in FIG. 3, ramp generator circuit 332 generates a single ramp output, RAMP_SIGNAL 334, from an output terminal of a second operational amplifier 372 having an inverting input terminal that is capacitively coupled to the output terminal of the second operational amplifier 372 through capacitor Cint 374. In addition, the inverting input terminal is also coupled to the output terminal of the second operational amplifier 372 through a first ramp generator equalizing switch S1 376, which is also coupled to receive a current I_INTEG from a current source 384. In the example, the second operational amplifier 372 further includes a non-inverting input terminal coupled to a second reference voltage terminal to receive a voltage VRN 378. In one example, the voltage VRN 378 is sampled onto a capacitor C8 380 through a switch in response to a SAMP_VRN signal 382.

In operation, RAMP_SIGNAL 334 has a relatively large output voltage and therefore has low noise. The first capacitive voltage divider 336 is coupled to reduce the large output voltage swing of the first RAMP_SIGNAL 334 that coupled to be received by the analog to digital converter 330 to further reduce noise in the first RAMP_SIGNAL 334 in accordance with the teachings of the present invention. For instance, the voltage at the node between capacitor C1 356 and capacitor C2 358, which is coupled to the non-inverting input terminal of first operational amplifier 364, can be determined as follows:

$$V = \frac{C1}{C1+C2} \times \text{RAMP\_SIGNAL} \qquad \text{(Equation 1)}$$

where V is the voltage at the node between capacitor C1 356 and capacitor C2 358, C1 is the capacitance value of capacitor C1 356, C2 is the capacitance value of capacitor C2 358, and RAMP_SIGNAL is the voltage of RAMP_SIGNAL 334.

Figure 4:
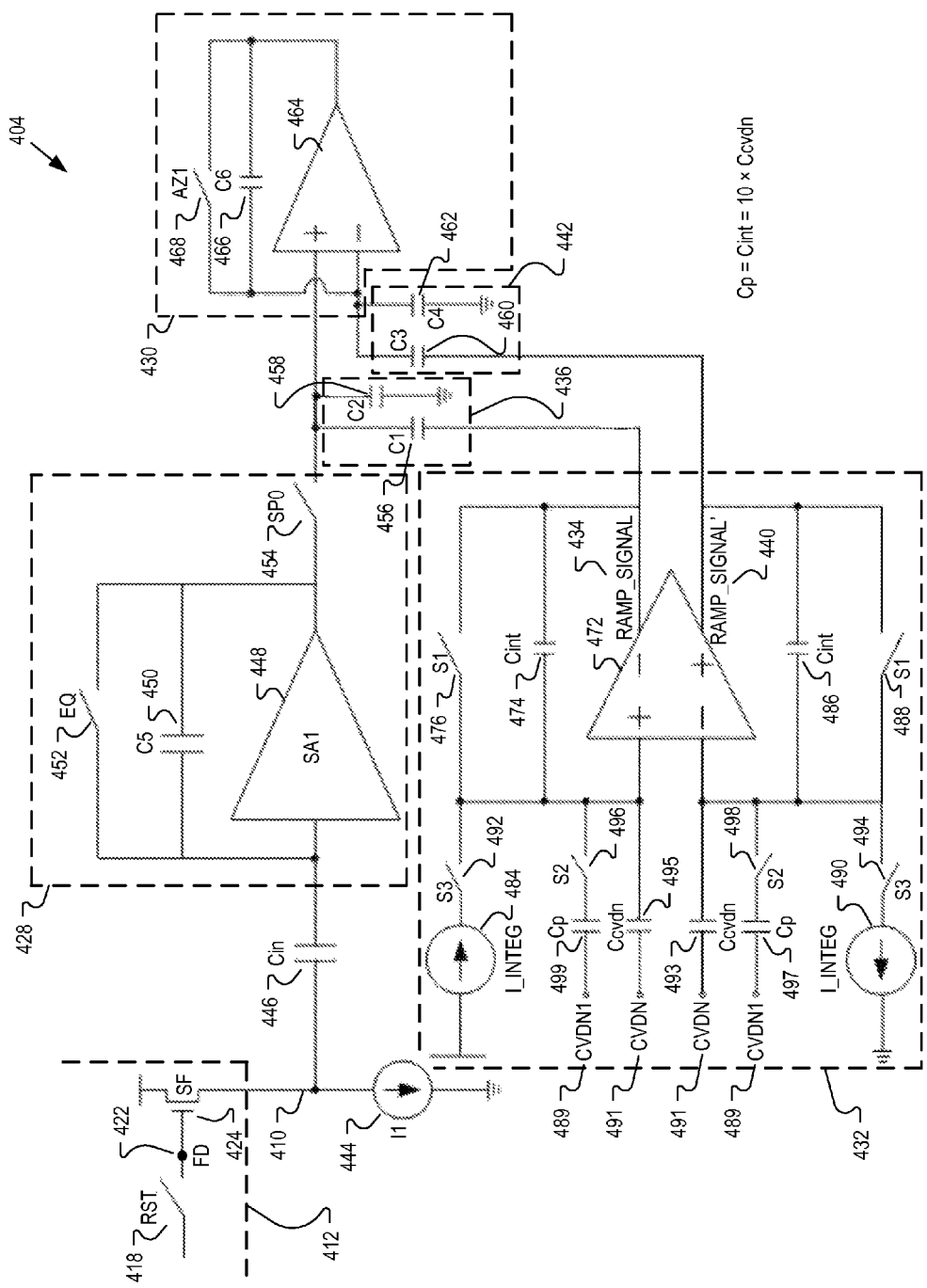
FIG. 4 is a schematic illustrating greater detail of another example of a ramp generator included in a readout circuit with low noise in accordance with the teachings of the present invention.

FIG. 4 is a schematic illustrating greater detail of another example of a ramp generator circuit 432 included in a readout circuit 404 with low noise in accordance with the teachings of the present invention. It is noted that readout circuit 404 of FIG. 4 shares many similarities with readout circuit 304 of FIG. 3. For instance, similar to readout circuit 304 of FIG. 3, readout circuit of FIG. 4 also includes a sense amplifier circuit 428 coupled to a bitline 410 to sense analog image data from a pixel cell 412 of an image sensor. An analog to digital converter 430 is coupled to sense amplifier circuit 428 to convert the analog image data from pixel cell 412 to digital image data. A ramp generator circuit 432 is coupled to generate a first ramp signal RAMP_SIGNAL 434 such that the analog to digital converter 430 is coupled to generate the digital image data in response to the analog image data from pixel cell 412 and first RAMP_SIGNAL 434. In addition, a first capacitive voltage divider 436 that includes a first capacitor C1 456 and a second capacitor C2 458 is coupled to ramp generator circuit 432. Furthermore, the first capacitive voltage divider 436 is coupled to reduce an output voltage swing of the first RAMP_SIGNAL 434 coupled to be received by the analog to digital converter 430 to reduce noise in the first RAMP_SIGNAL 434. Accordingly, it is appreciated that the elements in the readout circuit 404 FIG. 4 referenced below are coupled and function similarly to similarly named and numbered elements of readout circuit 304 of FIG. 3 described above.

One difference between readout circuit 404 of FIG. 4 and readout circuit 304 of FIG. 3 is that ramp generator circuit 432 of FIG. 4 has a differential ramp output including two ramp outputs, first RAMP_SIGNAL 434 and second RAMP_SIGNAL' 440. In the example, first RAMP_SIGNAL 434 and second RAMP_SIGNAL' 440 are complementary signals with a relatively large output voltage swings, and thus have low noise. In the example depicted in FIG. 4, a corresponding second capacitive voltage divider 442 is also coupled to ramp generator circuit 432 to reduce the voltage swing of second RAMP_SIGNAL' 440 and further reduces noise in accordance with the teachings of the present invention.

As shown in FIG. 4, the second capacitive voltage divider 442 includes a third capacitor C3 460 coupled to a fourth capacitor C4 462. The third capacitor C3 460 is coupled between the ramp generator circuit 432 and the inverting input terminal of a first operational amplifier 464 of the analog to digital converter 430. The fourth capacitor C4 462 is coupled between the inverting input terminal of first operational amplifier 464 and a first reference voltage terminal (e.g., ground). The first RAMP_SIGNAL 434 from ramp generator circuit 432 is coupled to the non-inverting terminal of the first operational amplifier 464 of FIG. 4 in a similar fashion as the first RAMP_SIGNAL 334 from ramp generator circuit 332 is coupled to the non-inverting terminal of the first operational amplifier 364 of FIG. 3. As such, the analog to digital converter 430 of FIG. 4 is coupled to generate the digital image data in response to the analog image data received through sense amplifier circuit 428, the first RAMP_SIGNAL 434, and the second RAMP_SIGNAL' 440 from ramp generator circuit 432 in accordance with the teachings of the present invention.

As shown in the example depicted in FIG. 4, the ramp generator circuit 432 includes a differential output operational amplifier 472 having a first inverting output terminal coupled to generate the first RAMP_SIGNAL 434, and a second non-inverting output to generate the second RAMP_SIGNAL' 440. In the example, the first RAMP_SIGNAL 434 and second RAMP_SIGNAL' 440 form a differential output with complementary signals. As shown in the example, differential output operational amplifier 472 also includes a non-inverting input terminal and an inverting input terminal.

In the example, the non-inverting input terminal of the differential output operational amplifier 472 is capacitively coupled to the inverting output terminal of the differential output operational amplifier 472 through capacitor Cint 474. In addition, the non-inverting input terminal is coupled to the inverting output terminal of the differential output operational amplifier 472 through a first differential output operational amplifier equalizing switch S1 476. In the example, the non-inverting input terminal is further coupled to an I_INTEG current source 484 through a switch S3 492. In the example, the non-inverting input terminal is further capacitively coupled through a capacitor Cp 499 to receive a CVDN1 489 signal through a switch S2 496. In the example, the non-inverting input terminal is further capacitively coupled through a capacitor Ccvdn 495 to receive a CVDN 491 signal.

In the example, the inverting input terminal of the differential output operational amplifier 472 is capacitively coupled to the non-inverting output terminal of the differential output operational amplifier 472 through capacitor Cint 486. In addition, the inverting input terminal is coupled to the non-inverting output terminal of the differential output operational amplifier 472 through a second differential output operational amplifier equalizing switch S1 488. In the example, the inverting input terminal is further coupled to an I_INTEG current source 490 through a switch S3 494. In the example, the inverting input terminal is further capacitively coupled through a capacitor Cp 497 to receive the CVDN1 489 signal through a switch S2 498. In the example, the inverting input terminal is further capacitively coupled through a capacitor Ccvdn 493 to receive the CVDN 491 signal. In one example, the relationship between the Cp, Cint, and Ccvdn capacitance values is:

$$Cp = Cint = 10 \times Ccvdn \qquad \text{(Equation 2)}$$

It is appreciated that the example ramp generator circuit 432 of FIG. 4 with first and second capacitive voltage dividers 436 and 442, respectively, provide a fully differential ramp output that can be implemented to further improve dynamic range. For instance, the fully differential ramp generator example depicted in FIG. 4 can double the dynamic range compared to a single-ended ramp generator example. In addition, as power supply output voltages continue to decrease with technology advances, fully differential ramp generator 432 with first and second capacitive voltage dividers 436 and 442, respectively, provides sufficient gain and bandwidth compared to single-ended ramp generator examples, while providing improved power supply rejection ratio and common mode rejection ratio performance to provide sufficient drive capabilities with class AB output stages, with noise performance comparable to single-ended ramp generators in accordance with the teachings of the present invention.

Figure 5:
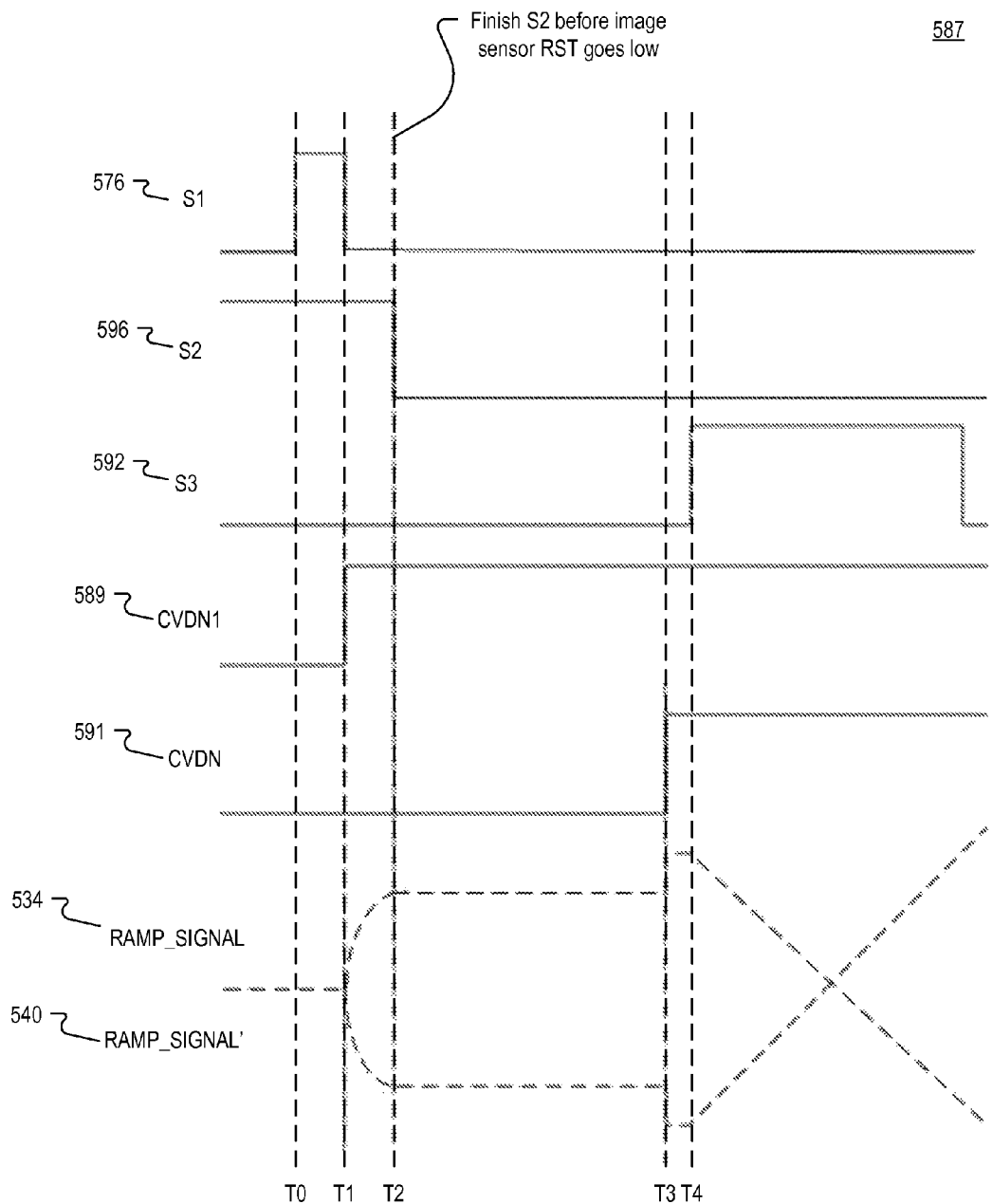
FIG. 5 illustrates a timing diagram of signals in an example ramp generator included in a readout circuit with low noise in accordance with the teachings of the present invention.

FIG. 5 illustrates an example timing diagram 587 that explains the relationship of the signals in the example ramp generator circuit 432 included in a readout circuit 404 of FIG. 4 with low noise in accordance with the teachings of the present invention. Accordingly, it is appreciated that the signals and elements described in FIG. 5 referenced below are coupled and function in the same way as similarly named and numbered elements of readout circuit 404 of FIG. 4 referenced above.

In particular, as shown in FIG. 5, at time T0, signal S1 576 transitions from a low value to a high value, which turns ON the first and second differential output operational amplifier equalizing switches S1 476 and S1 488, and resets and/or initializes the first RAMP_SIGNAL 534 and the second RAMP_SIGNAL' 540.

At time T1, signal S1 576 transitions from the high value back to the low value, signal S2 596 is at a high value, signal S3 592 is at a low value, signal CVDN 591 is at a low value, and signal CVDN1 589 transitions from low value to high value. Thus, the non-inverting and inverting input terminals of differential output operational amplifier 472 are capacitively coupled to the high value of CVDN1 through capacitances have a value of Cp. As such, the complementary first RAMP_SIGNAL 534 and the second RAMP_SIGNAL' 540 signals begin pre-charging as shown in FIG. 5. In the illustrated example, it is appreciated that the signal S2 596 remains at the high value to finish pre-charging the complementary first RAMP_SIGNAL 534 and the second RAMP_SIGNAL' 540 signals before the reset RST signal 418 of the pixel cell 412 goes low.

At time T2, the pre-charging of the complementary first RAMP_SIGNAL 534 and the second RAMP_SIGNAL' 540 signals is complete, and signal S2 596 can therefore transition from the high value to a low value, while signal CVDN 591 remains at the low value, and signal CVDN1 589 remains at the high value. At this time, the complementary first RAMP_SIGNAL 534 and the second RAMP_SIGNAL' 540 remain at their respective pre-charged levels as shown.

At time T3, signal CVDN 591 transitions from a low value to a high value. Thus, the non-inverting and inverting input terminals of differential output operational amplifier 472 are capacitively coupled to the high value of CVDN through capacitances have a value of Ccvdn. As such, the complementary first RAMP_SIGNAL 534 and the second RAMP_SIGNAL' 540 signals are now adjusted to their starting ramp voltage levels as shown in FIG. 5.

At time T4, signal S3 592 transitions from a low level to a high level, which couple the I_INTEG current source 484 to the non-inverting terminal, and the I_INTEG current source 490 to the non-inverting and inverting terminals, respectively, of the differential output operational amplifier 472. Therefore, the complementary first RAMP_SIGNAL 534 and the second RAMP_SIGNAL' 540 begin ramping at time T4 as shown in FIG. 5.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A readout circuit for use in an image sensor, comprising:

a sense amplifier circuit coupled to a bitline to sense analog image data from a pixel cell of the image sensor;

an analog to digital converter coupled to the sense amplifier circuit to convert the analog image data to digital image data;

a ramp generator circuit coupled to generate a first ramp signal, wherein the analog to digital converter is coupled to generate the digital image data in response to the analog image data and the first ramp signal; and a first capacitive voltage divider coupled to the ramp generator, wherein the first capacitive voltage divider is coupled to reduce an output voltage swing of the first ramp signal coupled to be received by the analog to digital converter to reduce noise in the first ramp signal.

2. The readout circuit of claim 1 wherein the first capacitive voltage divider comprises a first capacitor coupled to a second capacitor, wherein the first capacitor is coupled between the ramp generator circuit and a first input terminal of the analog to digital converter, and wherein the second capacitor is coupled between the first input terminal of the analog to digital converter and a first reference voltage terminal.

3. The readout circuit of claim 2 wherein the analog to digital converter includes a first operational amplifier having the first input terminal coupled to the first and second capacitors of the first capacitive voltage divider, wherein the first operational amplifier further includes a second input terminal capacitively coupled to an output terminal of the first operational amplifier, and wherein the second input terminal of the first operational amplifier is further coupled to the output terminal of the first operational amplifier through an analog to digital converter equalizing switch.

4. The readout circuit of claim 3 wherein the ramp generator circuit comprises a second operational amplifier having a first input terminal capacitively coupled to an output terminal of the second operational amplifier, wherein the first input terminal of the second operational amplifier is further coupled to the output terminal of the second operational amplifier through a first ramp generator equalizing switch, and wherein the second operational amplifier further includes a second input terminal coupled to a second reference voltage terminal.

5. The readout circuit of claim 3 wherein the ramp generator circuit is further coupled to generate a second ramp signal such that the first and second ramp signals generated by the ramp generator circuit form a differential ramp output of the ramp generator circuit, wherein the first and second signals are complementary signals, wherein the analog to digital converter is coupled to generate the digital image data in response to the analog image data, the first ramp signal, and the second ramp signal.

6. The readout circuit of claim 5 further including a second capacitive voltage divider coupled to the ramp generator, wherein the second capacitive voltage divider is coupled to reduce an output voltage swing of the second ramp signal coupled to be received by the analog to digital converter to reduce noise in the second ramp signal.

7. The readout circuit of claim 6 wherein the second capacitive voltage divider comprises a third capacitor coupled to a fourth capacitor, wherein the third capacitor is coupled between the ramp generator circuit and the second terminal of the analog to digital converter, and wherein the fourth capacitor is coupled between the second terminal of the analog to digital converter and the first reference voltage terminal.

8. The readout circuit of claim 7 wherein the ramp generator circuit comprises a differential output operational amplifier having a first output terminal coupled to generate the first ramp signal, and wherein the differential output operational amplifier further includes a second output terminal coupled to generate the second ramp signal.

9. The readout circuit of claim 8 wherein the differential output operational amplifier further includes a first input terminal capacitively coupled to the first output terminal of the differential output operational amplifier, wherein the first input terminal of the differential output operational amplifier is further coupled to the first output terminal of the differential output operational amplifier through a first differential output operational amplifier equalizing switch, wherein the differential output operational amplifier further includes a second input terminal capacitively coupled to the second output terminal of the differential output operational amplifier, wherein the second input terminal of the differential output operational amplifier is further coupled to the second output terminal of the differential output operational amplifier through a second differential output operational amplifier equalizing switch.

10. An imaging system, comprising:
a pixel array including a plurality of pixel cells organized into a plurality of rows and columns for capturing image data;
control circuitry coupled to the pixel array to control operation of the pixel array; and
a readout circuit coupled to the pixel array to readout the image data from the pixel cells, the readout circuit including:
a sense amplifier circuit coupled to a bitline to sense analog image data from pixel array;
an analog to digital converter coupled to the sense amplifier circuit to convert the analog image data to digital image data;
a ramp generator circuit coupled to generate a first ramp signal, wherein the analog to digital converter is coupled to generate the digital image data in response to the analog image data and the first ramp signal; and
a first capacitive voltage divider coupled to the ramp generator, wherein the first capacitive voltage divider is coupled to reduce an output voltage swing of the first ramp signal coupled to be received by the analog to digital converter to reduce noise in the first ramp signal.

11. The imaging system of claim 10 further comprising function logic coupled to the readout circuitry to store the image data readout from the plurality of pixel cells.

12. The imaging system of claim 10 wherein the first capacitive voltage divider comprises a first capacitor coupled to a second capacitor, wherein the first capacitor is coupled between the ramp generator circuit and a first input terminal of the analog to digital converter, and wherein the second capacitor is coupled between the first input terminal of the analog to digital converter and a first reference voltage terminal.

13. The imaging system of claim 12 wherein the analog to digital converter includes a first operational amplifier having the first input terminal coupled to the first and second capacitors of the first capacitive voltage divider, wherein the first operational amplifier further includes a second input terminal capacitively coupled to an output terminal of the first operational amplifier, and wherein the second input terminal of the first operational amplifier is further coupled to the output terminal of the first operational amplifier through an analog to digital converter equalizing switch.

14. The imaging system of claim 13 wherein the ramp generator circuit comprises a second operational amplifier having a first input terminal capacitively coupled to an output terminal of the second operational amplifier, wherein the first input terminal of the second operational amplifier is further coupled to the output terminal of the second operational amplifier through a first ramp generator equalizing switch, and wherein the second operational amplifier further includes a second input terminal coupled to a second reference voltage terminal.

15. The imaging system of claim 13 wherein the ramp generator circuit is further coupled to generate a second ramp signal such that the first and second ramp signals generated by the ramp generator circuit form a differential ramp output of the ramp generator circuit, wherein the first and second ramp signals are complementary signals, wherein the analog to digital converter is coupled to generate the digital image data in response to the analog image data, the first ramp signal, and the second ramp signal.

16. The imaging system of claim 15 further including a second capacitive voltage divider coupled to the ramp generator, wherein the second capacitive voltage divider is coupled to reduce an output voltage swing of the second ramp signal coupled to be received by the analog to digital converter to reduce noise in the second ramp signal.

17. The imaging system of claim 16 wherein the second capacitive voltage divider comprises a third capacitor coupled to a fourth capacitor, wherein the third capacitor is coupled between the ramp generator circuit and the second terminal of the analog to digital converter, and wherein the fourth capacitor is coupled between the second terminal of the analog to digital converter and the first reference voltage terminal.

18. The imaging system of claim 17 wherein the ramp generator circuit comprises a differential output operational amplifier having a first output terminal coupled to generate the first ramp signal, and wherein the differential output operational amplifier further includes a second output terminal coupled to generate the second ramp signal.

19. The imaging system of claim 18 wherein the differential output operational amplifier further includes a first input terminal capacitively coupled to the first output terminal of the differential output operational amplifier, wherein the first input terminal of the differential output operational amplifier is further coupled to the first output terminal of the differential output operational amplifier through a first differential output operational amplifier equalizing switch, wherein the differential output operational amplifier further includes a second input terminal capacitively coupled to the second output terminal of the differential output operational amplifier, wherein the second input terminal of the differential output operational amplifier is further coupled to the second output terminal of the differential output operational amplifier through a second differential output operational amplifier equalizing switch.

* * * * *